(12) United States Patent
Kim

(10) Patent No.: US 11,720,257 B2
(45) Date of Patent: Aug. 8, 2023

(54) ELECTRONIC DEVICE AND METHOD FOR DETERMINING LIFESPAN AND FAILURE OF NONVOLATILE MEMORY STORAGE DEVICE

(71) Applicant: Thinkware Corporation, Gyeonggi-Do (KR)

(72) Inventor: Dae Won Kim, Gyeonggi-Do (KR)

(73) Assignee: THINKWARE CORPORATION, Gyeonggi-Do (KR)

(*) Notice: Subject to any disclaimer, the term of this patent is extended or adjusted under 35 U.S.C. 154(b) by 6 days.

(21) Appl. No.: 17/383,872

(22) Filed: Jul. 23, 2021

(65) Prior Publication Data

US 2022/0027057 A1 Jan. 27, 2022

(30) Foreign Application Priority Data

Jul. 24, 2020 (KR) .................. 10-2020-0092622
Jun. 21, 2021 (KR) .................. 10-2021-0079984

(51) Int. Cl.
*G06F 3/06* (2006.01)

(52) U.S. Cl.
CPC .......... *G06F 3/0616* (2013.01); *G06F 3/0605* (2013.01); *G06F 3/0619* (2013.01); *G06F 3/0659* (2013.01); *G06F 3/0679* (2013.01)

(58) Field of Classification Search
CPC .... G06F 3/0616; G06F 3/0605; G06F 3/0619; G06F 3/0659; G06F 3/0679; G06F 3/0634; G06F 3/0653; G06F 3/0656; G06F 2201/81; G06F 2201/88; G06F 11/076; G06F 11/3034; G06F 11/3055; G06F 11/3058

See application file for complete search history.

(56) References Cited

U.S. PATENT DOCUMENTS

| | | | |
|---|---|---|---|
| 9,559,862 B1* | 1/2017 | Dash | G06F 3/06 |
| 10,055,596 B1* | 8/2018 | Czamara | G06F 21/87 |
| 10,545,683 B2* | 1/2020 | Kraemer | G06F 3/0689 |
| 2015/0205657 A1* | 7/2015 | Clark | G06F 11/008 |
| | | | 714/47.3 |
| 2016/0004849 A1* | 1/2016 | Lee | H04N 21/6334 |
| | | | 726/27 |
| 2020/0020398 A1* | 1/2020 | Miller | G06F 3/0653 |
| 2021/0064481 A1* | 3/2021 | Patel | G06F 11/1076 |

* cited by examiner

*Primary Examiner* — Hiep T Nguyen
(74) *Attorney, Agent, or Firm* — Hayes Soloway PC

(57) ABSTRACT

Various embodiments provide an electronic device and method for determining the lifespan and failure of a nonvolatile memory storage device. The electronic device and the method according to various embodiments may be configured to determine whether the storage device has failed in response to a connection with the storage device, output a guidance message for replacing the storage device when the storage device fails, confirm whether the storage device has a function of autonomously identifying its state when the storage device is normal, check the lifespan of the storage device based on state information received from the storage device when the storage device has the function, estimate the lifespan of the storage device when the storage device does not have the function, and output the guidance message for replacing the storage device based on the lifespan.

18 Claims, 13 Drawing Sheets

ELECTRONIC DEVICE AND METHOD FOR DETERMINING LIFESPAN AND FAILURE OF NONVOLATILE MEMORY STORAGE DEVICE

CROSS-REFERENCES TO RELATED APPLICATIONS

This application is based on and claims priority under 35 U.S.C. 119 to Korean Patent Application Nos. 10-2020-0092622 filed on Jul. 24, 2020 and 10-2021-0079984 filed on Jun. 21, 2021 in the Korean intellectual property office, the disclosures of which are herein incorporated by reference in their entireties.

TECHNICAL FIELD

Various embodiments relate to an electronic device and method for determining the lifespan and failure of a nonvolatile memory storage device.

BACKGROUND OF THE INVENTION

The capacity and speed of a nonvolatile memory storage device are rapidly increased. Accordingly, the nonvolatile memory storage device is mounted on an electronic device and widely used. The storage device has predetermined lifespan for its write and erase operations due to its physical and electrical characteristics. The lifespan is decreased as the storage device is used. Furthermore, if the lifespan has a specific value or less, the storage device does not operate normally. For example, an average write speed of the storage device is decreased or data is not stored in the storage device normally. A storage device, such as a hard disk drive (HDD) or a solid state drive (SDD), has a function of autonomously identifying its state and provides state information based on the identified state, so that a user can replace the storage device. However, a storage device, such as a secure digital (SD) card or a USB flash memory, does not have such a function.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide an electronic device and method for determining the lifespan and failure of a nonvolatile memory storage device mounted on the electronic device.

Various embodiments provide an electronic device and method for determining the lifespan and failure of a nonvolatile memory storage device not having a function of autonomously identifying its state.

Various embodiments provide an electronic device on and from which a nonvolatile memory storage device is mounted and separated, and a method thereof.

A method of an electronic device according to various embodiments may include detecting a connection with a storage device, estimating a lifespan of the storage device, and outputting a guidance message for replacing the storage device based on the lifespan.

A method of an electronic device according to various embodiments may include determining whether a storage device has failed in response to a connection with the storage device, outputting a guidance message for replacing the storage device when the storage device fails, estimating a lifespan of the storage device when the storage device is normal, and outputting a guidance message for replacing the storage device based on the lifespan.

An electronic device according to various embodiments includes a connection terminal configured for a connection with the storage device and a processor connected to the connection terminal and configured to store data in the storage device through the connection terminal. The processor may be configured to estimate a lifespan of the storage device and to output a guidance message for replacing the storage device based on the lifespan.

According to various embodiments, the electronic device can determine the lifespan and failure of a nonvolatile memory storage device mounted thereon. In this case, the electronic device can confirm the lifespan of a storage device having a function of autonomously identifying its state based on state information from the storage device. In addition, the electronic device can estimate the lifespan of a storage device not having the function of autonomously identifying its state. That is, the electronic device can determine the lifespan and failure of a storage device regardless of the type of storage device mounted thereon. Accordingly, the electronic device can accurately notify a user of the time when the storage device is replaced based on the lifespan and failure of the storage device. As a result, use efficiency of the storage device can be increased.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, various embodiments of this document are described with reference to the accompanying drawings.

Figure 1:
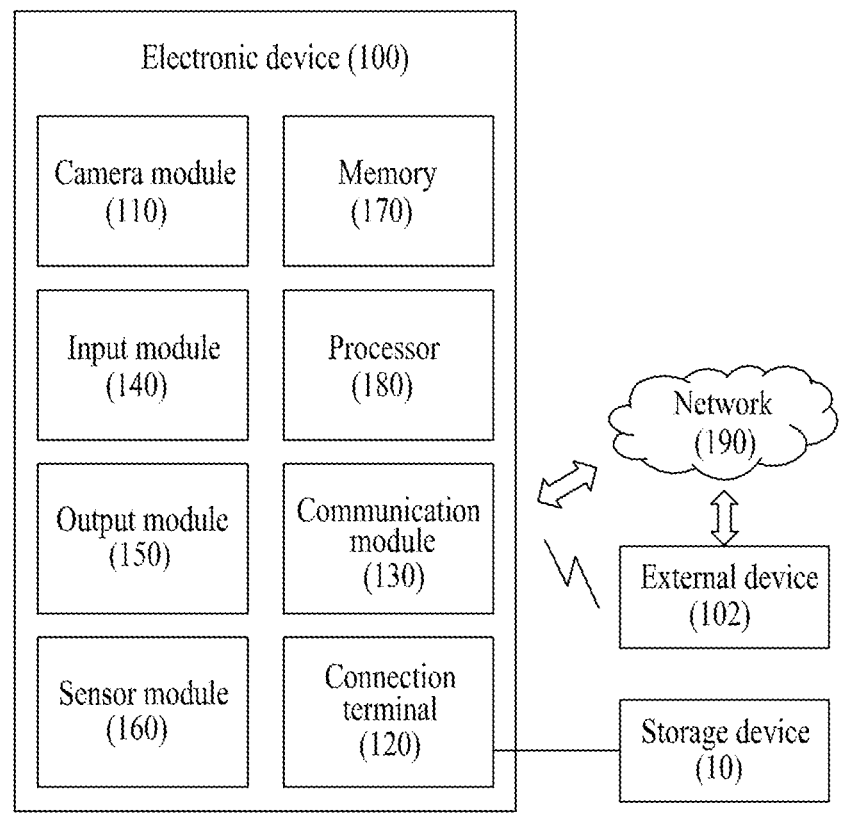
FIG. 1 is a diagram schematically illustrating an electronic device according to various embodiments.

FIG. 1 is a diagram schematically illustrating an electronic device 100 according to various embodiments.

Referring to FIG. 1, the electronic device 100 according to various embodiments may be implemented in a way to be mounted on and separated from a nonvolatile memory storage device 10. For example, the storage device 10 may include at least one of a secure digital (SD) card or a universal serial bus (USB) flash drive. The electronic device 100 may include at least one of a camera module 110, a connection terminal 120, a communication module 130, an input module 140, an output module 150, a sensor module 160, a memory 170, or a processor 180. In some embodiments, at least one of the components of the electronic device 100 may be omitted, and at least another component may be added to the electronic device 100. In some embodiments, at least two of the components of the electronic device 100 may be implemented as a single integrated circuit. For example, the electronic device 100 may include at least one of a black box, a smart phone, a mobile phone, a computer, a notebook, a terminal for digital broadcasting, personal digital assistants (PDA), a portable multimedia player (PMP), a tablet PC, a game console, a wearable device, an Internet of things (IoT) device, or a robot.

The camera module 110 may capture an image in the electronic device 100. In this case, the camera module 110 may be installed at a predetermined location of the electronic device 100, and may capture an image. The camera module 110 may collect an image signal through the capturing. For example, the camera module 110 may include at least one of a lens, at least one image sensor or a flash.

The connection terminal 120 may be physically connected an external device 102 or the storage device 10 in the electronic device 100. To this end, the connection terminal 120 may include at least one connector. For example, the connector may include at least one of an HDMI connector, a USB connector, an SD card connector or an audio connector.

The communication module 130 may perform communication with the external device 102 in the electronic device 100. The communication module 130 may establish a communication channel between the electronic device 100 and the external device 102, and may perform communication with the external device 102 through the communication channel. In this case, the external device 102 may include at least one of a satellite, a base station, a server or another electronic device. The communication module 130 may include at least one of a wired communication module or a wireless communication module. The wired communication module is connected to the external device 102 through wires via the connection terminal 120, and may perform communication through the wires. The wireless communication module may include at least one of a short-distance communication module or a long-distance communication module. The short-distance communication module may communicate with the external device 102 by using the short-distance communication method. For example, the short-distance communication method may include at least one of Bluetooth, WiFi direct, or infrared data association (IrDA). The long-distance communication module may communicate with the external device 102 by using the long-distance communication method. In this case, the long-distance communication module may communicate with the external device 102 over a network 190. For example, the network 190 may include at least one of a cellular network, the Internet, or a computer network, such as a local area network (LAN) or a wide area network (WAN).

The input module 140 may input a signal to be used to at least one component of the electronic device 100. The input module 140 may generate a signal by receiving, from a user, a command or data to be used in the processor 180. In this case, the input module 140 may collect an audio signal. For example, the input module 140 may include at least one of a microphone, a mouse or a keyboard. In an embodiment, the input module 140 may include at least one of a touch circuitry configured to detect a touch or a sensor circuitry configured to measure the intensity of a force generated by a touch.

The output module 150 may output information of the electronic device 100. The output module 150 may include at least one of a display module for visually displaying information or an audio output module for outputting information as an audio signal. For example, the display module may include at least one of a display, a hologram device or a projector. For example, the display module may be implemented as a touch screen by being assembled with at least one of the touch circuitry or sensor circuitry of the input module 140. For example, the audio output device may include at least one of a speaker or a receiver.

The sensor module 160 may generate an electric signal or data value corresponding to an operating state (e.g., power or a temperature) within the electronic device 100 or an external environment state. For example, the sensor module 160 may include at least one of a radar sensor, a LIDAR sensor, a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor or an illumination sensor.

The memory 170 may store various data used by at least one component of the electronic device 100. For example, the memory 170 may include at least one of a volatile memory or a nonvolatile memory. The data may include at least one program and input data or output data related to the program. The program may be stored in the memory 170 as software including at least one instruction, and may include at least one of an operating system, a middleware or an application, for example.

The processor 180 may control at least one component of the electronic device 100 by executing a program of the memory 170. Accordingly, the processor 180 may perform data processing or operation. In this case, the processor 180 may execute an instruction stored in the memory 170. The processor 180 may be connected to the connection terminal 120, and may store data in the storage device 10 through the connection terminal 120. In this case, the processor 180 may store data as files. While connected to the storage device 10, the processor 180 may determine the lifespan and failure of the storage device 10. Furthermore, the processor 180 may output a guidance message for replacing the storage device 10 based on the lifespan or failure of the storage device 10.

In this case, the processor 180 may output the guidance message through the output module 150. For example, the processor 180 may display the guidance message as at least one of text or an emission signal through the display module, or may output the guidance message as an audio signal through the audio output module. Accordingly, a user of the electronic device 100 may determine whether to replace the storage device 10 based on the guidance message, and will replace the storage device 10 according to circumstances.

Figure 2:
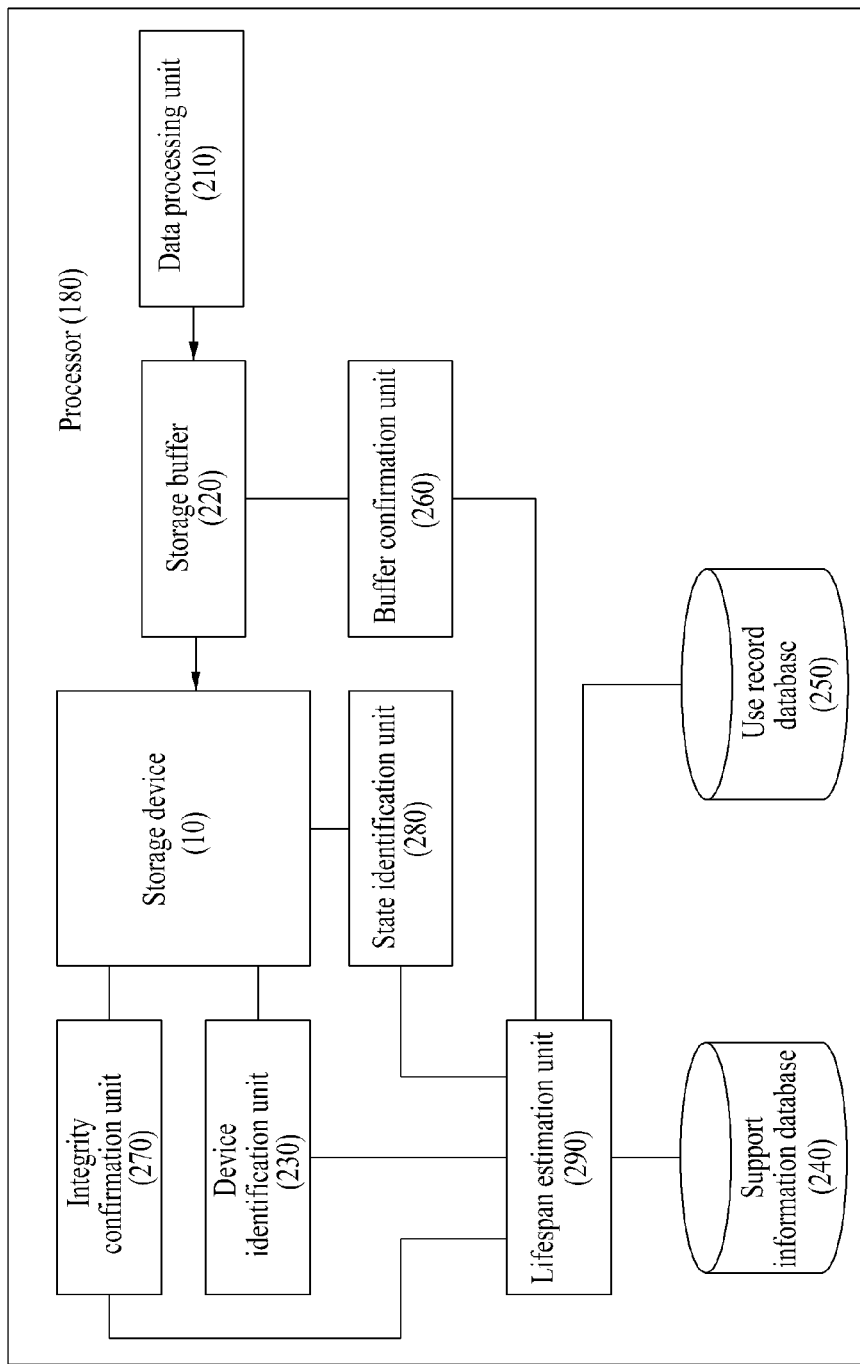
FIG. 2 is a diagram specifically illustrating a processor of the electronic device according to a first embodiment.
Figure 3:
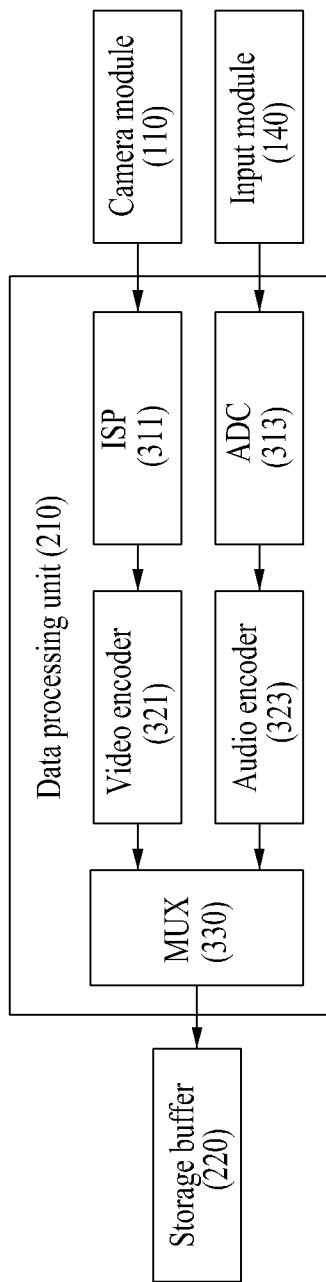
FIG. 3 is a diagram exemplarily illustrating a data processing unit of FIG. 2.

FIG. 2 is a diagram specifically illustrating a processor 180 of the electronic device 100 according to a first embodiment. FIG. 3 is a diagram exemplarily illustrating a data processing unit 210 of FIG. 2.

Referring to FIG. 2, the processor 180 of the electronic device 100 according to the first embodiment is connected to the storage device 10 mounted on the electronic device 100, and may include at least one of a data processing unit 210, a storage buffer 220, a device identification unit 230, a support information database 240, a use record database 250, a buffer confirmation unit 260, an integrity confirmation unit 270, a state identification unit 280, or a lifespan estimation unit 290. In FIG. 2, all the components of the processor 180 have been illustrated as being configured within the processor 180, but the present disclosure is not limited thereto. That is, some of the components of the processor 180 may be configured outside the processor 180.

The data processing unit 210 may process data to be stored in the storage device 10. In this case, the data processing unit 210 may process a signal or data received from at least one of the camera module 110, the input module 140, the sensor module 160, the memory 170, or the communication module 130. For example, if the electronic device 100 is an image recording device for encoding image data obtained through the camera module 110, such as a blackbox for a vehicle or a car video recorder, as illustrated in FIG. 3, the data processing unit 210 may include an image signal processor (ISP) 311, a video encoder 321, an analog-to-digital convertor (ADC) 313, an audio encoder 323, and a multiplexer (MUX) 330. The ISP 311 may convert, into digital image data, an analog image signal received through the camera module 110. The video encoder 321 may represent the digital image data as bits. The ADC 313 may convert, into digital audio data, an analog audio signal received through the microphone of the input module 140. The audio encoder 323 may represent the digital audio data as bits. The MUX 330 may output the image data and the audio data to the storage buffer 220 together. In this case, the MUX 330 may integrate the image data and the audio data into multimedia data, and may output the multimedia data to the storage buffer 220.

The storage buffer 220 may be configured to temporarily store data stored in the storage device 10. To this end, the storage buffer 220 may be disposed between the data processing unit 210 and the storage device 10. Furthermore, the storage buffer 220 may store data output by the data processing unit 210. Accordingly, the storage device 10 may fetch data stored in the storage buffer 220, and may store the data. In this case, if the lifespan of the storage device 10 sufficiently remains, an average write speed in the storage device 10 is maintained within a normal range, and the amount of data stored in the storage buffer 220 may also be maintained to a buffer threshold or less. Furthermore, if the lifespan of the storage device 10 does not sufficiently remain, in order to recover a storage cell or relocate a cell to another cell within the storage device 10, an average write speed in the storage device 10 may be decreased less than the normal range, and the amount of data stored in the storage buffer 220 may be increased to exceed a buffer threshold.

The device identification unit 230 may identify the storage device 10 in response to a connection with the storage device 10. In this case, the device identification unit 230 may detect identification information of the storage device 10 from the storage device 10. In this case, the identification information of the storage device 10 may include manufacturer information (e.g., an original equipment manufacturing (OEM) code), product information (e.g., a product name or a product code), and a unique identifier (e.g., a serial number) of the storage device 10.

The support information database 240 may have stored therein support information related to the storage device 10 which may be mounted on the electronic device 100. For example, the support information database 240 may be present inside the electronic device 100. In FIG. 2, the support information database 240 has been illustrated as being configured within the processor 180, but the present disclosure is not limited thereto. That is, although not illustrated, the support information database 240 may be present outside the processor 180, for example, in the memory 170. For another example, although not illustrated, the support information database 240 may be present outside the electronic device 100. In this case, the support information database 240 may be preset in a server (not illustrated) capable of communicating with the electronic device 100. The support information database 240 may store support information of a storage device 10 in accordance with identification information of the corresponding storage device 10. The support information may include at least one of whether the storage device 10 has a function of autonomously identifying its state, or a maximum storage quantity of the storage device 10 predetermined by a manufacturer. A function of autonomously identifying, by the storage device 10, its state may be denoted as a health status monitoring function. The maximum storage quantity may be denoted as terabyte written (TBW). A maximum storage quantity when a write amplification factor (WAF) is 1 may be represented as a terabyte unit. The WAF may be a value predetermined with respect to the storage device 10 depending on a data storage method and characteristic of the storage device 10. For example, the WAF may be experimentally or theoretically derived depending on an implementation method of an application and file system of the electronic device 100 using the storage device 10.

The use record database 250 may have stored the use record of the storage device 10 that had been mounted on the electronic device 100. According to the first embodiment, the use record database 250 may be present inside the electronic device 100. In FIG. 2, the use record database 250 has been illustrated as being configured within the processor 180, but the present disclosure is not limited thereto. That is, although not illustrated, the use record database 250 may be present outside the processor 180, for example, in the memory 170. The use record database 250 may store the use record of a corresponding storage device 10 in accordance with identification information of the storage device 10. The use record may include a record of the amount of data stored in the storage device 10.

The buffer confirmation unit 260 may confirm the amount of data stored in the storage buffer 220. In this case, the buffer confirmation unit 260 may monitor whether the amount of data stored in the storage buffer 220 is greater than a buffer threshold.

The integrity confirmation unit 270 may confirm the integrity of each of files of data stored in the storage device 10. In this case, the storage device 10 may store verification values for respective files while storing data as the files. For example, the verification values may be represented as a hash value or a file check sum. In this case, the verification values may be generated by the data processing unit 210. For example, if the electronic device 100 is an image recording device for encoding image data obtained through the camera module 110, such as a blackbox for a vehicle or a car video recorder, the verification values may be generated by the MUX 330. However, when the lifespan of the storage device 10 is reached, a broken phenomenon occurs in a file stored in the storage device 10. Accordingly, a verification value of the corresponding file may also be changed. Accordingly, the integrity confirmation unit 270 may confirm the integrity of each of files by using verification values of the files. In this case, the integrity confirmation unit 270 may divide each of the files into a normal file or an abnormal file.

The state identification unit 280 may identify a state of the storage device 10. Furthermore, the state identification unit 280 may obtain state information from the storage device 10 having a function of autonomously identifying its state.

The lifespan estimation unit 290 may determine whether the storage device 10 has failed. The lifespan estimation unit 290 may confirm whether a write protection mode has been set in the storage device 10 through the state identification unit 280, and may determine whether the storage device 10 has failed based on the confirmation. In this case, the write protection mode may be set in the storage device 10 when the lifespan of the storage device 10 is reached. Accordingly, if the write protection mode has been set in the storage device 10, the lifespan estimation unit 290 may determine that the storage device 10 has failed. The lifespan estimation unit 290 may determine whether the storage device 10 has failed based on a count of abnormal files confirmed through the integrity confirmation unit 270. That is, when the count is greater than a count threshold, the state identification unit 280 may determine that the storage device 10 has failed. Accordingly, if it is determined that the storage device 10 has failed, the lifespan estimation unit 290 may output, through the output module 150, a guidance message based on the failure of the storage device 10.

Furthermore, the lifespan estimation unit 290 may estimate the lifespan of the storage device 10. If it is confirmed that the storage device 10 has the function of autonomously identifying its state through the support information database 240, the lifespan estimation unit 290 may check the lifespan of the storage device 10 based on state information received from the storage device 10 through the state identification unit 280. If it is confirmed that the storage device 10 does not have the function of autonomously identifying its state through the support information database 240, the lifespan estimation unit 290 may estimate the lifespan of the storage device 10. The lifespan estimation unit 290 may check the amount of data stored in the storage buffer 220 through the buffer confirmation unit 260, and may estimate the lifespan of the storage device 10 based on the checked amount. The lifespan estimation unit 290 may check a record of the amount of data stored in the storage device 10 through the use record database 250, and may estimate the lifespan of the storage device 10 based on the checked record. In this case, when storing data in the storage device 10 is terminated, the lifespan estimation unit 290 may update a record of the amount of data stored in the storage device 10 in the use record database 250. In this case, the lifespan estimation unit 290 may estimate the lifespan of the storage device 10 based on the product of the amount of data stored in the storage device 10 and a WAF predetermined with respect to the storage device 10. Accordingly, the lifespan estimation unit 290 may estimate the lifespan of the storage device 10, and may output a guidance message for replacing the storage device 10 through the output module 150 based on the estimated lifespan.

Figure 4:
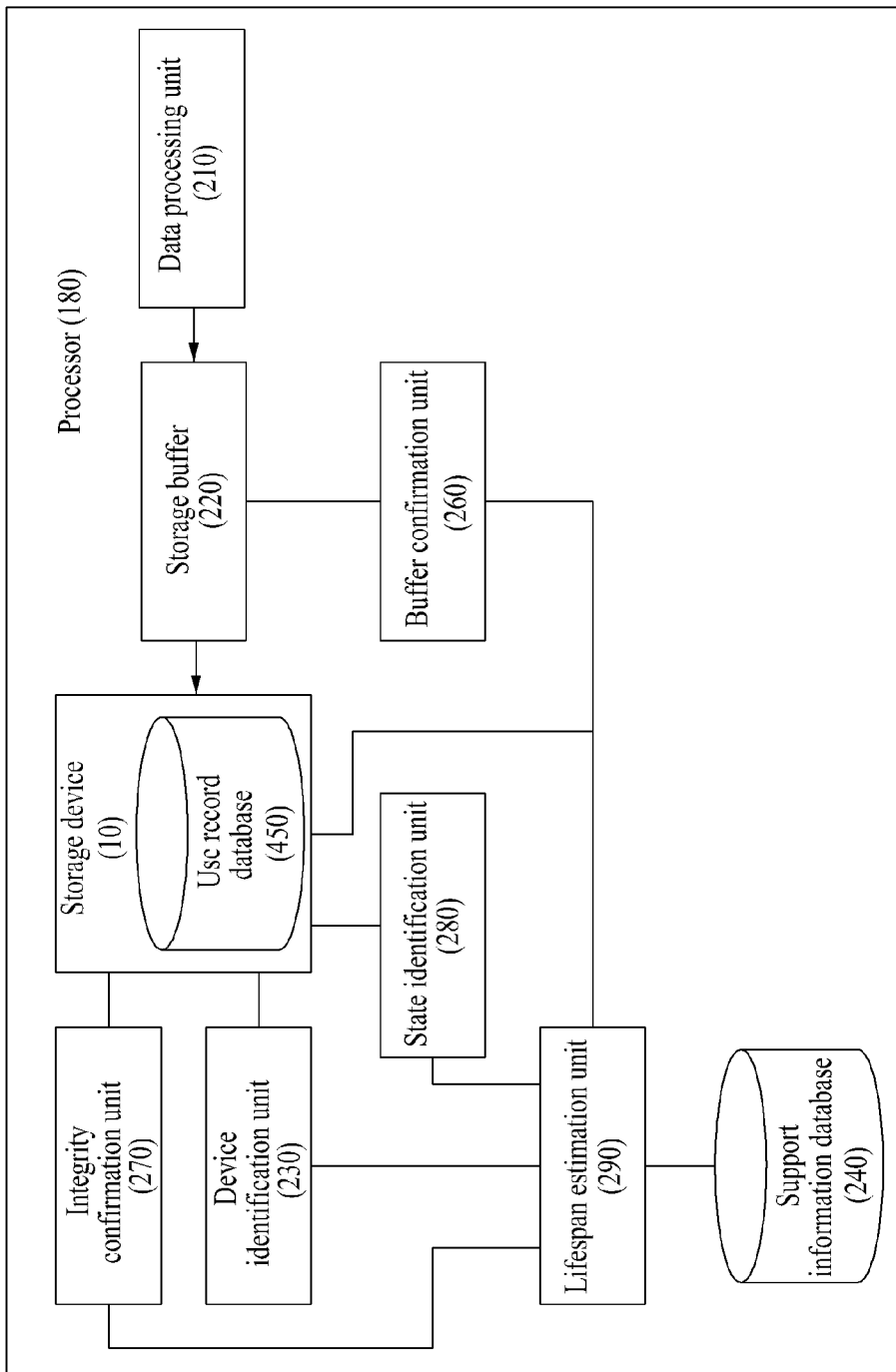
FIG. 4 is a diagram specifically illustrating a processor of the electronic device according to a second embodiment.

FIG. 4 is a diagram specifically illustrating a processor 180 of the electronic device 100 according to a second embodiment.

Referring to FIG. 4, the processor 180 of the electronic device 100 according to the second embodiment is connected to the storage device 10 mounted on the electronic device 100, and may include at least one of a data processing unit 210, a storage buffer 220, a device identification unit 230, a support information database 240, a buffer confirmation unit 260, an integrity confirmation unit 270, a state identification unit 280, or a lifespan estimation unit 290. In FIG. 4, all the components of the processor 180 have been illustrated as being configured within the processor 180, but the present disclosure is not limited thereto. That is, some of the components of the processor 180 may be configured outside the processor 180. In this case, the components of the second embodiment are generally similar to those of the first embodiment, and detailed descriptions thereof are omitted. However, in the first embodiment, the electronic device 100 includes the use record database 250. In contrast, in the second embodiment, the storage device 10 may include a use record database 450.

The use record database 450 may have stored the use record of the storage device 10. According to the second embodiment, the use record database 450 is present within the storage device 10, and may have stored only the use record of the corresponding storage device 10. The use record database 450 may store a record of the amount of data stored in the corresponding storage device 10.

Figure 5:
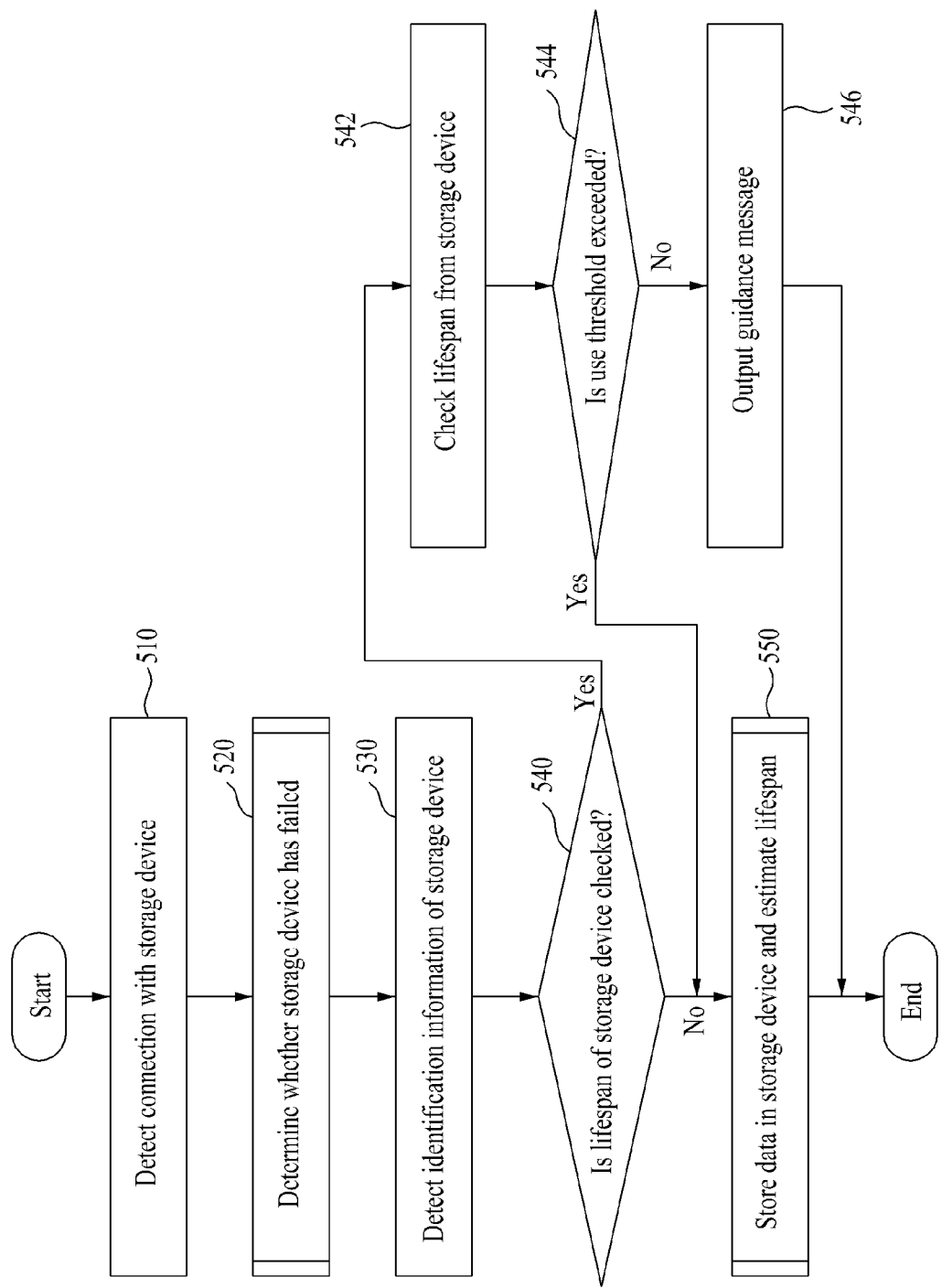
FIG. 5 is a diagram illustrating a method of the electronic device according to various embodiments.

FIG. 5 is a diagram illustrating a method of the electronic device 100 according to various embodiments.

Referring to FIG. 5, in step 510, the electronic device 100 may detect a connection with the storage device 10. When the processor 180 is connected to the connection terminal 120 and the storage device 10 is mounted on the electronic device 100, the storage device 10 may be connected to the connection terminal 120. Accordingly, the processor 180 may detect the connection with the storage device 10 through the connection terminal 120.

In step 520, the electronic device 100 may determine whether the storage device 10 has failed. According to an embodiment, the processor 180 may determine whether the storage device 10 has failed based on whether the write protection mode has been set in the storage device 10. This will be more specifically described with reference to FIG. 6. According to another embodiment, the processor 180 may determine whether the storage device 10 has failed based on the integrity of files of data stored in the storage device 10. This will be more specifically described with reference to FIG. 7. According to still another embodiment, the processor 180 may determine whether the storage device 10 has failed based on a combination of whether the write protection mode has been set in the storage device 10 and the integrity of files of data stored in the storage device 10. This will be more specifically described with reference to FIG. 8. In this case, if it is determined that the storage device 10 has failed, the processor 180 may output, through the output module 150, a guidance message based on a failure of the storage device 10. Furthermore, if it is determined that the storage device 10 is normal, the processor 180 may proceed to step 530.

In step 530, the electronic device 100 may detect identification information of the storage device 10. The processor 180 may detect the identification information of the storage device 10 from the storage device 10. In this case, the identification information of the storage device 10 may include manufacturer information, product information, and a unique identifier of the storage device 10.

In step 540, the electronic device 100 may determine whether the lifespan of the storage device 10 may be checked from the storage device 10. The processor 180 may confirm whether the storage device 10 has the function of autonomously identifying its state from the support information database 240 based on the identification information of the storage device 10. In this case, if the storage device 10 has the function of autonomously identifying its state, the processor 180 may determine that the lifespan can be checked from the storage device 10. If the storage device 10 has the function of autonomously identifying its state, the storage device 10 may provide state information. In this case, the state information may be denoted a health status command. If the storage device 10 does not have the function of autonomously identifying its state, the processor 180 may determine that the lifespan cannot be checked from the storage device 10.

If it is determined that the lifespan can be checked from the storage device 10 in step 540, in step 542, the electronic device 100 may check the lifespan of the storage device 10 from the storage device 10. The processor 180 may receive state information from the storage device 10, and may check the lifespan of the storage device 10 based on the state information. Furthermore, in step 544, the electronic device 100 may compare the lifespan of the storage device 10 with a use threshold. The processor 180 may determine whether the lifespan of the storage device 10 remains to the extent that it is greater than the use threshold. If it is determined that the lifespan of the storage device 10 is equal to or smaller than a use threshold or less in step 544, in step 546, the electronic device 100 may output a guidance message. The processor 180 may output the guidance message for replacing the storage device 10 through the output module 150. In this case, the processor 180 may generate the guidance message so that the lifespan of the storage device 10 is indicated.

If it is determined that the lifespan cannot be checked from the storage device 10 in step 540, in step 550, the electronic device 100 may store data in the storage device 10, and may estimate the lifespan of the storage device 10. Alternatively, in step 544, if it is determined that the lifespan of the storage device 10 remains to the extent that it is greater than the use threshold, in step 550, the electronic device 100 may store data in the storage device 10, and may estimate the lifespan of the storage device 10. According to an embodiment, the processor 180 may estimate the lifespan of the storage device 10 based on the amount of data stored in the storage buffer 220 while storing data in the storage device 10, by using the storage buffer 220. This will be more specifically described later with reference to FIG. 9. According to another embodiment, before storing data in the storage device 10, the processor 180 may estimate the lifespan of the storage device 10 based on a record of the amount of data stored in the storage device 10. This will be more specifically described with reference to FIG. 10. According to still another embodiment, the processor 180 may estimate the lifespan of the storage device 10 by a combination of a record of the amount of data stored in the storage device 10 and the amount of data stored in the storage buffer 220. This will be more specifically described with reference to FIG. 11. In this case, the processor 180 may output a guidance message for replacing the storage device 10 while storing data in the storage device 10 or without storing data in the storage device 10, based on the lifespan of the storage device 10.

Figure 6:
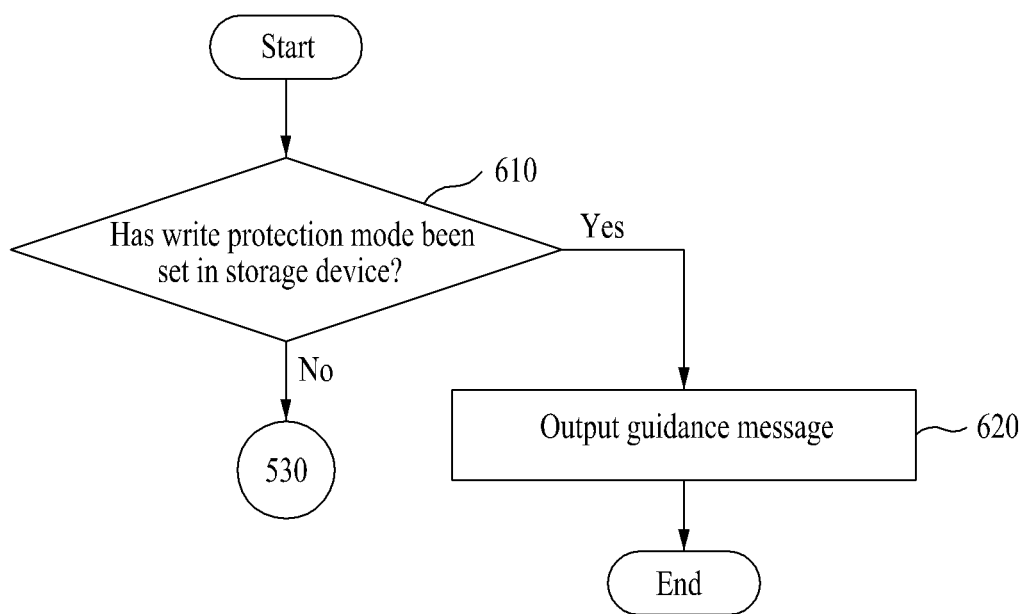
FIG. 6 is a diagram illustrating a step of determining whether a storage device has failed in FIG. 5 according to an embodiment.

FIG. 6 is a diagram illustrating the step (step 520) of determining whether the storage device 10 has failed in FIG. 5 according to an embodiment.

Referring to FIG. 6, in step 610, the electronic device 100 may determine whether a write protection mode has been set in the storage device 10. In this case, when the lifespan of the storage device 10 is reached, the write protection mode may be set in the storage device 10. The processor 180 may determine whether the write protection mode has been set in the storage device 10, and may determine whether the storage device 10 has failed based on the determination.

If it is determined that the write protection mode has been set in the storage device 10 in step 610, in step 620, the electronic device 100 may output a guidance message. In this case, the processor 180 may determine that the storage device 10 has failed, and may output the guidance message. The processor 180 may output the guidance message based on a failure of the storage device 10 through the output module 150.

If the write protection mode has not been set in the storage device 10 in step 610, the electronic device 100 may proceed to step 530. In this case, the processor 180 may determine that the storage device 10 is normal.

Figure 7:
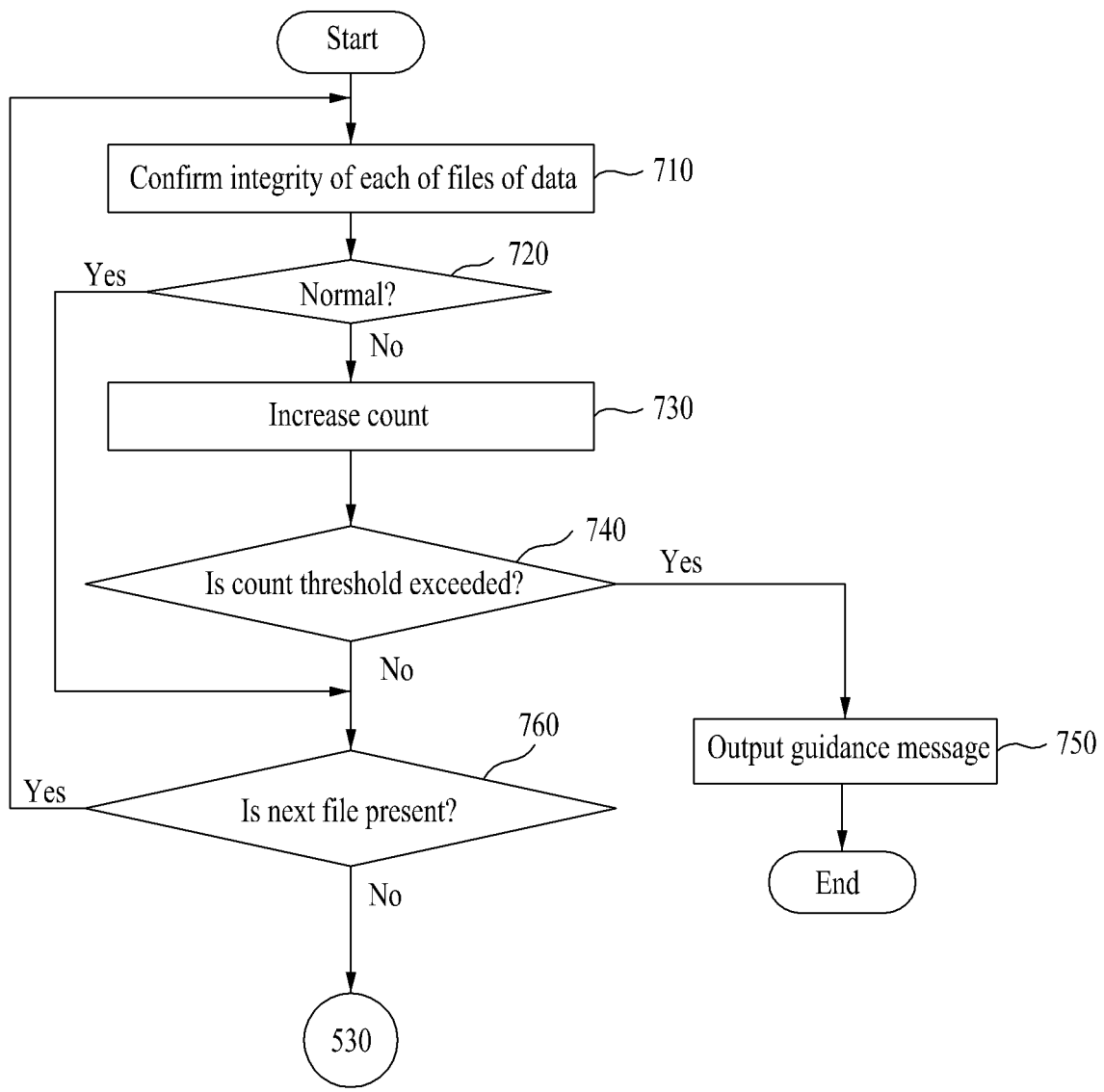
FIG. 7 is a diagram illustrating a step of determining whether the storage device has failed in FIG. 5 according to another embodiment.

FIG. 7 is a diagram illustrating the step (step 520) of determining whether the storage device 10 has failed in FIG. 5 according to another embodiment.

Referring to FIG. 7, in step 710, the electronic device 100 may confirm the integrity of each of files of data stored in the storage device 10. In this case, the storage device 10 may store verification values of the respective files while storing the data as the files. For example, the verification values may be represented as a hash value or a file check sum. In this case, the verification values may be generated by the data processing unit 210. For example, if the electronic device 100 is an image recording device for encoding image data obtained through the camera module 110, such as a blackbox for a vehicle or a car video recorder, the verification values may be generated by the MUX 330. However, when the lifespan of the storage device 10 is reached, a broken phenomenon occurs in a file stored in the storage device 10, and thus a verification value of a corresponding file may also be changed. Accordingly, the processor 180 may confirm the integrity of the corresponding file based on the verification value of the corresponding file. That is, the processor 180 may confirm whether the corresponding file is identical with contents stored in the storage buffer 220 based on the verification value of the corresponding file.

In step 720, the electronic device 100 may determine whether the corresponding file is normal. The processor 180 may determine whether the corresponding file is a normal file or an abnormal file based on the integrity of the corresponding file. That is, the processor 180 may determine whether the corresponding file is a normal file having contents stored in the storage buffer 220 or an abnormal file in which a broken phenomenon has occurred.

If it is determined that the corresponding file is abnormal in step 720, in step 730, the electronic device 100 may increase a count of the abnormal files. The processor 180 may increase the count by 1. Furthermore, in step 740, the electronic device 100 may compare the count with a count threshold. In this case, the processor 180 may determine whether the count is greater than the count threshold.

If it is determined that the count is greater than the count threshold in step 740, in step 750, the electronic device 100 may output a guidance message. In this case, the processor 180 may determine that the storage device 10 has failed, and may output the guidance message. The processor 180 may output the guidance message based on the failure of the storage device 10 through the output module 150.

If it is determined that the count is equal to or smaller than the count threshold in step 740, in step 760, the electronic device 100 may determine whether a next file is present in the storage device 10. That is, the processor 180 may determine whether the integrity of all the files of the storage device 10 has been confirmed.

If it is determined that a next file is present in the storage device 10 in step 760, the electronic device 100 may return to step 710. Thereafter, the electronic device 100 may repeatedly perform at least some of steps 710 to 760. The processor 180 may repeat at least some of steps 710 to 760 until it is determined that the count is greater than the count threshold in step 740 or it is determined that a next file is not present in step 760.

If it is determined that a next file is not present in step 760, the electronic device 100 may proceed to step 530. In this case, the processor 180 may determine that the storage device 10 is normal. That is, if an abnormal file having a count equal to or smaller than the count threshold is preset in all the files of the storage device 10, the processor 180 may determine that the storage device 10 is normal.

Figure 8:
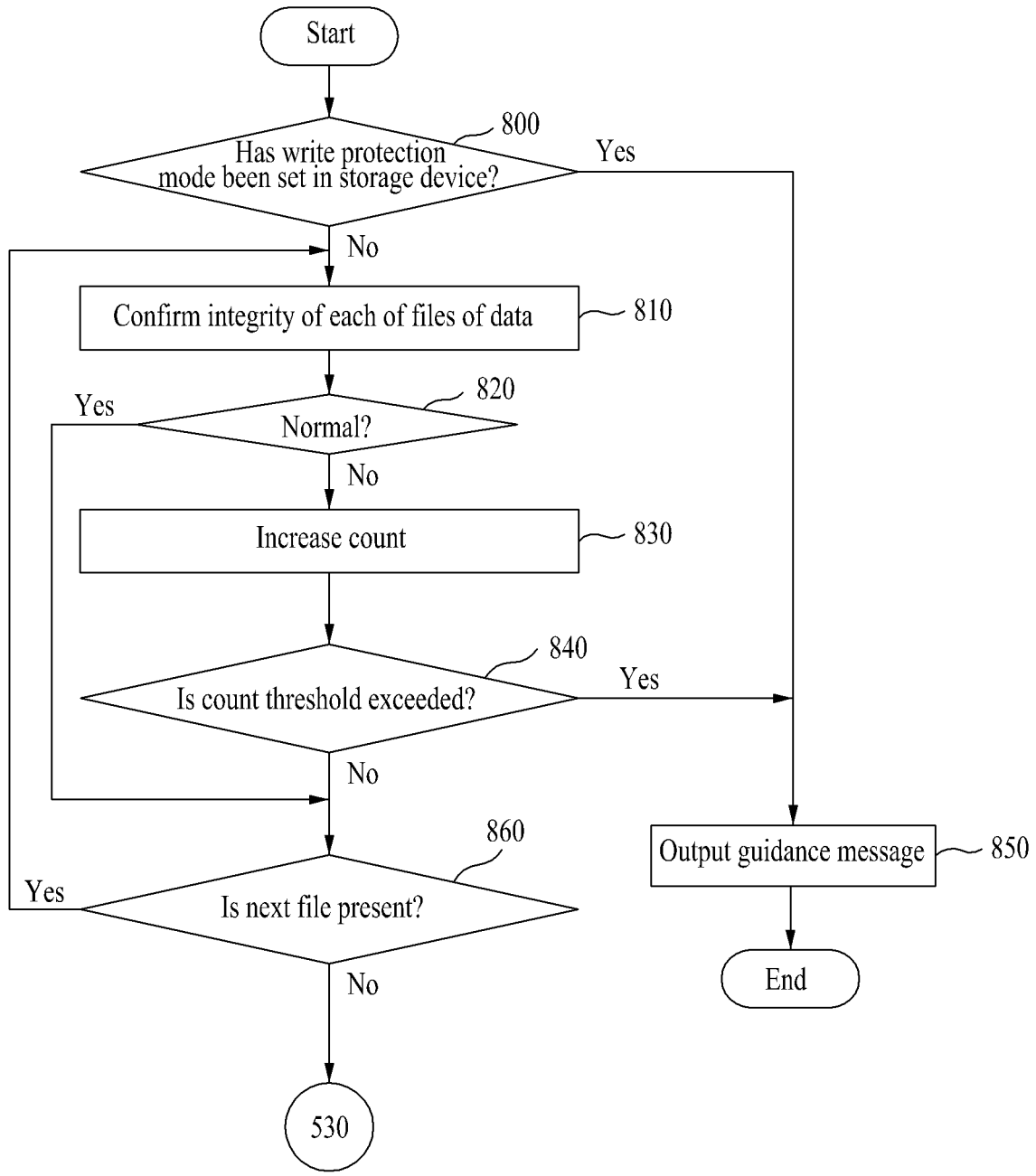
FIG. 8 is a diagram illustrating a step of determining whether the storage device has failed in FIG. 5 according to still another embodiment.

FIG. 8 is a diagram illustrating the step (step 520) of determining whether the storage device 10 has failed in FIG. 5 according to still another embodiment.

Referring to FIG. 8, in step 800, the electronic device 100 may determine whether the write protection mode has been set in the storage device 10. In this case, step 800 is similar to step 610 of FIG. 6, and thus a detailed description thereof is omitted.

If it is determined that the write protection mode has been set in the storage device 10 in step 800, in step 850, the electronic device 100 may output a guidance message. In this case, the processor 180 may determine that the storage device 10 has failed, and may output the guidance message. The processor 180 may output the guidance message based on the failure of the storage device 10 through the output module 150.

If the write protection mode has not been set in the storage device 10 in step 800, in step 810, the electronic device 100 may confirm the integrity of each of files of data stored in the storage device 10. In this case, steps 810 to 860 are similar to steps 710 to 760 of FIG. 7, and thus detailed descriptions thereof are omitted. Accordingly, if it is determined that the count is greater than a count threshold in step 840, in step 850, the electronic device 100 may output a guidance message. In this case, the processor 180 may determine that the storage device 10 has failed, and may output the guidance message. If it is determined that the integrity of all the files of the storage device 10 has been confirmed in step 860, the electronic device 100 may proceed to step 530. In this case, the processor 180 may determine that the storage device 10 is normal. That is, if the write protection mode has not been set in the storage device 10 and an abnormal file having a count equal to or smaller than the count threshold is present in all the files of the storage device 10, the processor 180 may determine that the storage device 10 is normal.

Figure 9:
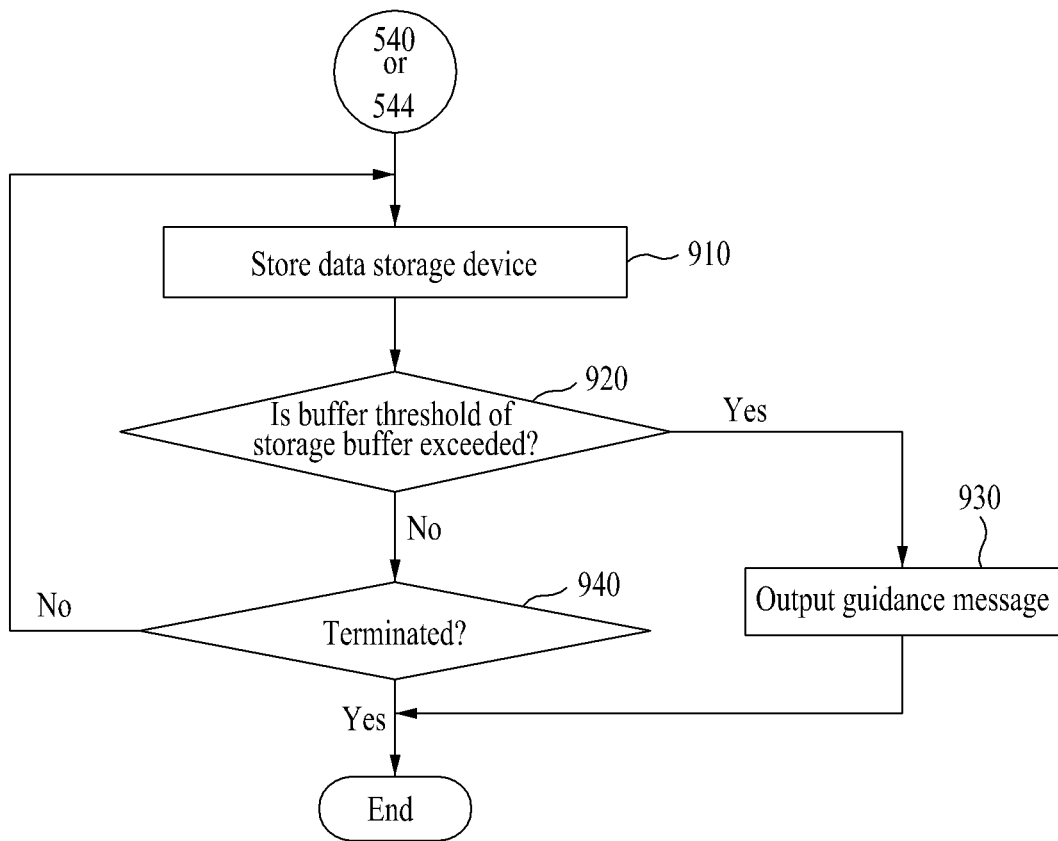
FIG. 9 is a diagram illustrating a step of estimating the lifespan of the storage device in FIG. 5 according to an embodiment.

FIG. 9 is a diagram illustrating the step (step 550) of estimating the lifespan of the storage device 10 in FIG. 5 according to an embodiment.

Referring to FIG. 9, in step 910, the electronic device 100 may store data in the storage device 10. The processor 180 may store data in the storage device 10 by using the storage buffer 220. The storage buffer 220 may temporarily store data output by the data processing unit 210 between the data processing unit 210 and the storage device 10. Accordingly, the storage device 10 may fetch data stored in the storage buffer 220, and may store the data. In this case, when the lifespan of the storage device 10 sufficiently remains, an average write speed in the storage device 10 is maintained within a normal range, and the amount of data stored in the storage buffer 220 may also be maintained to a buffer threshold or less. Furthermore, when the lifespan of the storage device 10 does not sufficiently remain, in order to recover a storage cell within the storage device 10 or relocate a storage cell to another cell, an average write speed in the storage device 10 is reduced less than a normal range, and the amount of data stored in the storage buffer 220 may be increased greater than a buffer threshold.

In step 920, the electronic device 100 may confirm the amount of data stored in the storage buffer 220, while storing data in the storage device 10 in step 910. In this case, the processor 180 may monitor whether the amount of data stored in the storage buffer 220 is greater than a buffer threshold.

If it is determined that the amount of data stored in the storage buffer 220 is greater than the buffer threshold in step 920, in step 930, the electronic device 100 may output a guidance message. In this case, the processor 180 may consider that the lifespan of the storage device 10 is equal to or smaller than a use threshold, and may output the guidance message. The processor 180 may output the guidance message for replacing the storage device 10 through the output module 150. For example, the processor 180 may estimate the lifespan of the storage device 10 based on the amount of data stored in the storage buffer 220, and may generate the guidance message so that the lifespan of the storage device 10 is indicted.

If it is determined that the amount of data stored in the storage buffer 220 is equal to or smaller than the buffer threshold in step 920, in step 940, the electronic device 100 may determine whether to terminate storing data in the storage device 10. The processor 180 may monitor whether an event for terminating storing data in the storage device 10 occurs.

If it is determined that storing data in the storage device 10 will not be terminated in step 940, the electronic device 100 may return to step 910. Thereafter, the electronic device 100 may repeatedly perform at least some of steps 910 to 940. The processor 180 may repeat at least some of steps 910 to 940 until it is determined that the amount of data stored in the storage buffer 220 is greater than the buffer threshold in step 920 or it is determined that storing data in the storage device 10 will be terminated in step 940. If it is determined that storing data in the storage device 10 needs to be terminated in step 940, the electronic device 100 may terminate storing data in the storage device 10.

Figure 10:
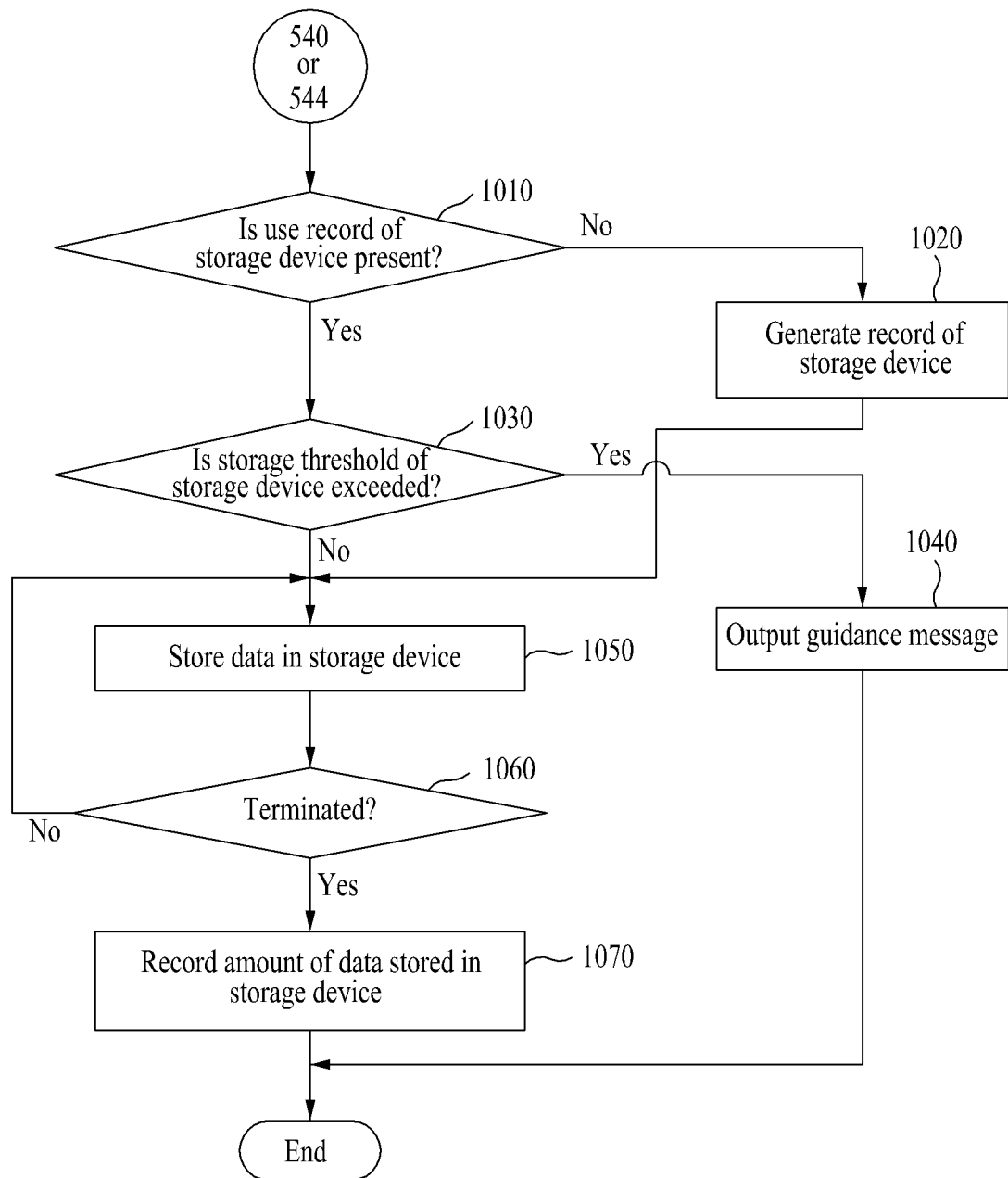
FIG. 10 is a diagram illustrating a step of estimating the lifespan of the storage device in FIG. 5 according to another embodiment.

FIG. 10 is a diagram illustrating the step (step 550) of estimating the lifespan of the storage device 10 in FIG. 5 according to another embodiment.

Referring to FIG. 10, in step 1010, the electronic device 100 may determine whether a use record of the storage device 10 is present. For example, if the electronic device 100 stores the use record database 250 therein, the processor 180 may determine whether a use record of the storage device 10 is present in the use record database 250 based on identification information of the storage device 10. That is, the processor 180 may determine whether a record of the amount of data stored in the storage device 10 is present in the use record database 250. For another example, if the storage device 10 stores the use record database 450 therein, the processor 180 may determine whether a record of the amount of data stored in the storage device 10 is present in the use record database 450.

If it is determined that the use record of the storage device 10 is not present in step 1010, in step 1020, the electronic device 100 may generate a record for the use record of the storage device 10. For example, if the electronic device 100 stores the use record database 250, the processor 180 may generate the record in the use record database 250 based on identification information of the storage device 10. For another example, if the storage device 10 stores the use record database 450, the processor 180 may generate a record in the use record database 450. Thereafter, the electronic device 100 may proceed to step 1050.

If it is determined that the use record of the storage device 10 is present in step 1010, in step 1030, the electronic device 100 may compare, with a storage threshold, a storage quantity estimated based on the amount of data stored in the storage device 10. In this case, the processor 180 may estimate the storage quantity based on the product of the amount of data stored in the storage device 10 and a WAF predetermined with respect to the storage device 10. Furthermore, the processor 180 may determine whether the storage quantity is equal to or greater than a storage threshold. In this case, the storage threshold may be determined based on a maximum storage quantity, for example, a TBW predetermined by a manufacturer with respect to a corresponding storage device 10. When the lifespan of the storage device 10 sufficiently remains, the storage quantity is smaller than the TBW. Accordingly, the storage threshold may be determined as a value smaller than the TBW.

If it is determined that the storage quantity of the storage device 10 is equal to or greater than the storage threshold in step 1030, in step 1040, the electronic device 100 may output a guidance message. In this case, the processor 180 may consider that the lifespan of the storage device 10 is smaller than a use threshold, and may output the guidance message. The processor 180 may output the guidance message for replacing the storage device 10 through the output module 150. For example, the processor 180 may estimate the lifespan of the storage device 10 based on the amount of data stored in the storage device 10 or the storage quantity of the storage device 10, and may generate the guidance message so that the lifespan of the storage device 10 is indicated.

If it is determined that the storage quantity of the storage device 10 is less than the storage threshold in step 1030, in step 1050, the electronic device 100 may store data in the storage device 10. Alternatively, after generating a record for the storage device 10 in step 1020, in step 1050, the electronic device 100 may store data in the storage device 10. In this case, the processor 180 may store data in the storage device 10 by using the storage buffer 220.

In step 1060, the electronic device 100 may determine whether to terminate storing data in the storage device 10. The processor 180 may monitor whether an event for terminating storing data in the storage device 10 occurs.

If it is determined that storing data in the storage device 10 will not be terminated in step 1060, the electronic device 100 may return to step 1050. Thereafter, the electronic device 100 may repeatedly perform steps 1050 and 1060. The electronic device 100 may repeat steps 1050 and 1060 until it is determined that storing data in the storage device 10 needs to be terminated in step 1060.

If it is determined that storing data in the storage device 10 needs to be terminated in step 1060, in step 1070, the electronic device 100 may record the amount of data stored in the storage device 10 and then terminate storing data in the storage device 10. In this case, if it has been determined that the use record of the storage device 10 is present in step 910, the processor 180 may update the use record of the storage device 10 with the amount of data stored in the storage device 10. If a record for the storage device 10 has been generated in step 920, the processor 180 may input, into the record, a record of the amount of data stored in the storage device 10. For example, if the electronic device 100 stores the use record database 250, the processor 180 may record the amount of data stored in the storage device 10 on the use record database 250 based on identification information of the storage device 10. For another example, if the storage device 10 stores the use record database 450, the processor 180 may record the amount of data stored in the storage device 10 on the use record database 450.

Figure 11:
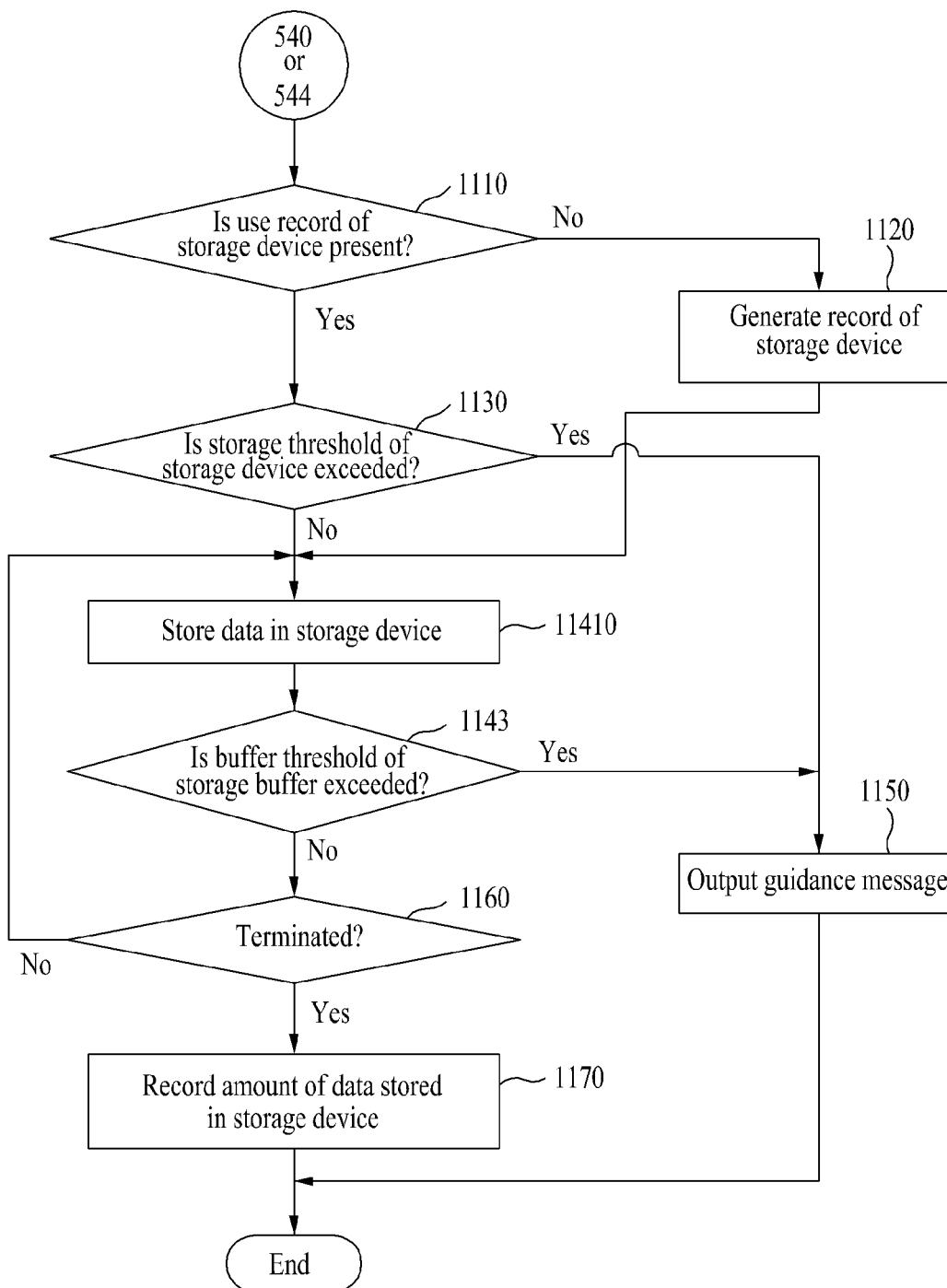
FIG. 11 is a diagram illustrating a step of estimating the lifespan of the storage device in FIG. 5 according to still another embodiment.

FIG. 11 is a diagram illustrating the step (step 550) of estimating the lifespan of the storage device 10 in FIG. 5 according to still another embodiment.

Referring to FIG. 11, in step 1110, the electronic device 100 may determine whether a use record of the storage device 10 is present. If it is determined that the use record of the storage device 10 is not present in step 1110, in step 1120, the electronic device 100 may generate a record for the use record of the storage device 10. If it is determined that the use record of the storage device 10 is present in step 1110, in step 1130, the electronic device 100 may compare, with a storage threshold, a storage quantity estimated based on the amount of data stored in the storage device 10. In this case, steps 1110 to 1130 are similar to steps 1010 to 1030 of FIG. 10, and thus detailed descriptions thereof are omitted.

If it is determined that the storage quantity of the storage device 10 is equal to or greater than the storage threshold in step 1130, in step 1150, the electronic device 100 may output a guidance message. In this case, the processor 180 may consider that the lifespan of the storage device 10 is smaller than a use threshold, and may output the guidance message. The processor 180 may output the guidance message for replacing the storage device 10 through the output module 150. For example, the processor 180 may estimate the lifespan of the storage device 10 based on the amount of data stored in the storage device 10 or the storage quantity of the storage device 10, and may generate the guidance message so that the lifespan of the storage device 10 is indicated.

If it is determined that the storage quantity of the storage device 10 is less than the storage threshold in step 1130, in step 1141, the electronic device 100 may store data in the storage device 10. Alternatively, after the electronic device 100 generates a record for the storage record of the storage device 10 in step 1120, in step 1141, the electronic device 100 may store data in the storage device 10. In this case, the processor 180 may store data in the storage device 10 by using the storage buffer 220.

In step 1143, the electronic device 100 may confirm the amount of data stored in the storage buffer 220 while storing data in the storage device 10 in step 1141. In this case, the processor 180 may monitor whether the amount of data stored in the storage buffer 220 is greater than the buffer threshold.

If it is determined that the amount of data stored in the storage buffer 220 is greater than the buffer threshold in step 1143, in step 1150, the electronic device 100 may output a guidance message. In this case, the processor 180 may consider that the lifespan of the storage device 10 is smaller than a use threshold, and may output the guidance message. The processor 180 may output the guidance message for replacing the storage device 10 through the output module 150. For example, the processor 180 may estimate the lifespan of the storage device 10 based on the amount of data stored in the storage buffer 220, and may generate the guidance message so that the lifespan of the storage device 10 is indicated.

If it is determined that the amount of data stored in the storage buffer 220 is equal to or smaller than the buffer threshold in step 1143, in step 1160, the electronic device 100 may determine whether to terminate storing data in the storage device 10. The processor 180 may monitor whether an event for terminating storing data in the storage device 10 occurs.

If it is determined that storing data in the storage device 10 will not be terminated in step 1160, the electronic device 100 may return to step 1141. Thereafter, the electronic device 100 may repeatedly perform at least some of steps 1141, 1143, 1150, and 1160. The processor 180 may repeat at least some of steps 1141, 1143, 1150, and 1160 until it is determined that the amount of data stored in the storage buffer 220 is greater than the buffer threshold in step 1143 or it is determined that storing data in the storage device 10 needs to be terminated in step 1160.

If it is determined that storing data in the storage device 10 needs to be terminated in step 1160, in step 1170, the electronic device 100 may record the amount of data stored in the storage device 10 and then terminate storing data in the storage device 10. In this case, step 1170 is similar to step 1170 of FIG. 10, and thus a detailed description thereof is omitted.

According to various embodiments, the lifespan and failure of the nonvolatile memory storage device 10 on which the electronic device 100 is mounted may be determined. In this case, the electronic device 100 may check the lifespan of the storage device 10 based on state information from the storage device 10 having a function of autonomously identifying its state. In addition, the electronic device 100 may estimate the lifespan of the storage device 10 not having the function of autonomously identifying its state. In this case, the electronic device 100 may estimate the lifespan of the storage device 10 based on a write characteristic of the storage device 10, for example, an average write speed of the storage device 10 or the amount of data stored in the storage device. That is, the electronic device 100 may determine the lifespan and failure of the storage device 10 regardless of the type of storage device 10 mounted thereon. Accordingly, the electronic device 100 can accurately notify a user of the time when the storage device 10 is replaced based on the lifespan and failure of the storage device 10. Accordingly, use efficiency of the storage device 10 can be increased.

Various embodiments may provide a method of the electronic device 100 on and from which the nonvolatile memory storage device 10 may be mounted and separated.

According to various embodiments, a method of the electronic device 100 may include steps of detecting a connection with the storage device 10, estimating the lifespan of the storage device 10, and outputting a guidance message for replacing the storage device 10 based on the lifespan.

According to various embodiments, a method of the electronic device 100 may further include steps of detecting identification information of the storage device 10, confirming whether the storage device 10 has a function of autonomously identifying its state based on the identification information, and checking the lifespan of the storage device 10 based on state information received from the storage device 10 if the storage device 10 has the function.

According to various embodiments, the step of estimating the lifespan may include estimating the lifespan if the storage device 10 does not have the function.

According to various embodiments, the electronic device 100 may include the storage buffer 220 configured to temporarily store data stored in the storage device 10.

According to various embodiments, the step of estimating the lifespan may include steps of storing data in the storage device 10 by using the storage buffer 220 and generating a guidance message when the amount of data stored in the storage buffer 220 is greater than a buffer threshold.

According to various embodiments, the step of generating the guidance message may include steps of estimating a lifespan based on the amount of data stored in the storage buffer 220 and generating the guidance message based on the lifespan.

According to various embodiments, a record for the amount of data stored in the storage device 10 may be present in at least one of the electronic device 100 or the storage device 10.

According to various embodiments, the step of estimating the lifespan may include a step of generating a guidance message when a storage quantity estimated based on the amount of data stored in the storage device 10 is equal to or greater than the storage threshold.

According to various embodiments, the storage quantity may be estimated by the product of the amount of data stored in the storage device 10 and a predetermined write amplification factor (WAF) of the storage device 10.

According to various embodiments, the step of generating the guidance message may include steps of estimating a lifespan based on the storage quantity and generating the guidance message based on the lifespan.

According to various embodiments, the step of estimating the lifespan may further include steps of storing data in the storage device 10 when the storage quantity is less than the storage threshold and updating a record when terminating storing data in data.

According to various embodiments, a method of the electronic device 100 may further include steps of determining whether the storage device 10 has failed in response to the connection with the storage device 10 and outputting a guidance message if the storage device 10 has failed.

According to various embodiments, the step of determining the failure may include a step of determining that the storage device 10 has failed if the write protection mode has been set in the storage device 10.

According to various embodiments, the write protection mode may be set in the storage device 10 when the lifespan of the storage device 10 is reached.

According to various embodiments, the step of determining the failure may include steps of checking a count of abnormal files by checking the integrity of each of files of data stored in the storage device 10 and determining that the storage device 10 has failed when the count is greater than a count threshold.

According to various embodiments, the electronic device 100 may store verification values of the respective files while storing the data in the storage device 10 as the files.

According to various embodiments, the integrity may be confirmed based on the verification values.

Various embodiments may provide the electronic device 100 on and from which the nonvolatile memory storage device 10 can be mounted and separated.

According to various embodiments, the electronic device 100 may include the connection terminal 120 configured for a connection with the storage device 10 and the processor 180 connected to the connection terminal 120 and configured to store data in the storage device 10 through the connection terminal 120.

According to various embodiments, the processor 180 may be configured to estimate the lifespan of the storage device 10 and to output a guidance message for replacing the storage device 10 based on the lifespan.

According to various embodiments, the processor 180 may be configured to detect identification information of the storage device 10, confirm whether the storage device 10 has a function of autonomously identifying its state based on the identification information, and check the lifespan of the storage device 10 based on state information received from the storage device 10 when the storage device 10 has the function.

According to various embodiments, the processor 180 may be configured to estimate the lifespan if the storage device 10 does not have the function.

According to various embodiments, the electronic device 100 may further include the storage buffer 220 configured to temporarily store data stored in the storage device 10.

According to various embodiments, the processor 180 may be configured to store data in the storage device 10 by using the storage buffer 220 and to 를 generate a guidance message when the amount of data stored in the storage buffer 220 is greater than a buffer threshold.

According to various embodiments, the processor 180 may be configured to estimate a lifespan based on the amount of data stored in the storage buffer 220 and to generate a guidance message based on the lifespan.

According to various embodiments, the processor 180 may be configured to check a record for the amount of data stored in the storage device 10 and to generate a guidance message when a storage quantity estimated based on the amount of data stored in the storage device 10 is equal to or greater than a storage threshold.

According to an embodiment, the electronic device 100 may further include the use record database 250 having a record for the amount of data stored in the storage device 10.

According to another embodiment, the storage device 10 may have a record for the amount of data stored in the storage device 10.

According to various embodiments, the storage quantity may be estimated by the product of the amount of data stored in the storage device 10 and a predetermined write amplification factor (WAF) of the storage device 10.

According to various embodiments, the processor 180 may be configured to estimate a lifespan based on the storage quantity and to generate a guidance message based on the lifespan.

According to various embodiments, the processor 180 may be configured to store data in the storage device 10 when a storage quantity is smaller than a storage threshold and to update a record for the amount of data stored in the storage device 10 when terminating storing data.

According to various embodiments, the processor 180 may be configured to determine whether the storage device 10 has failed in response to a connection with the storage device 10 and to output a guidance message if the storage device 10 has failed.

According to various embodiments, the processor 180 may be configured to determine that the storage device 10 has failed if the write protection mode has been set in the storage device 10.

According to various embodiments, the write protection mode may be set in the storage device 10 when the lifespan of the storage device 10 is reached.

According to various embodiments, the processor 180 may be configured to check a count of abnormal files by confirm the integrity of each of the files of data stored in the storage device 10 and to determine that the storage device 10 has failed when the count is greater than a count threshold.

According to various embodiments, the processor 180 may be configured to store verification values of the respective files while storing the data in the storage device 10 as the files and to check the integrity based on the verification values.

Figure 12:
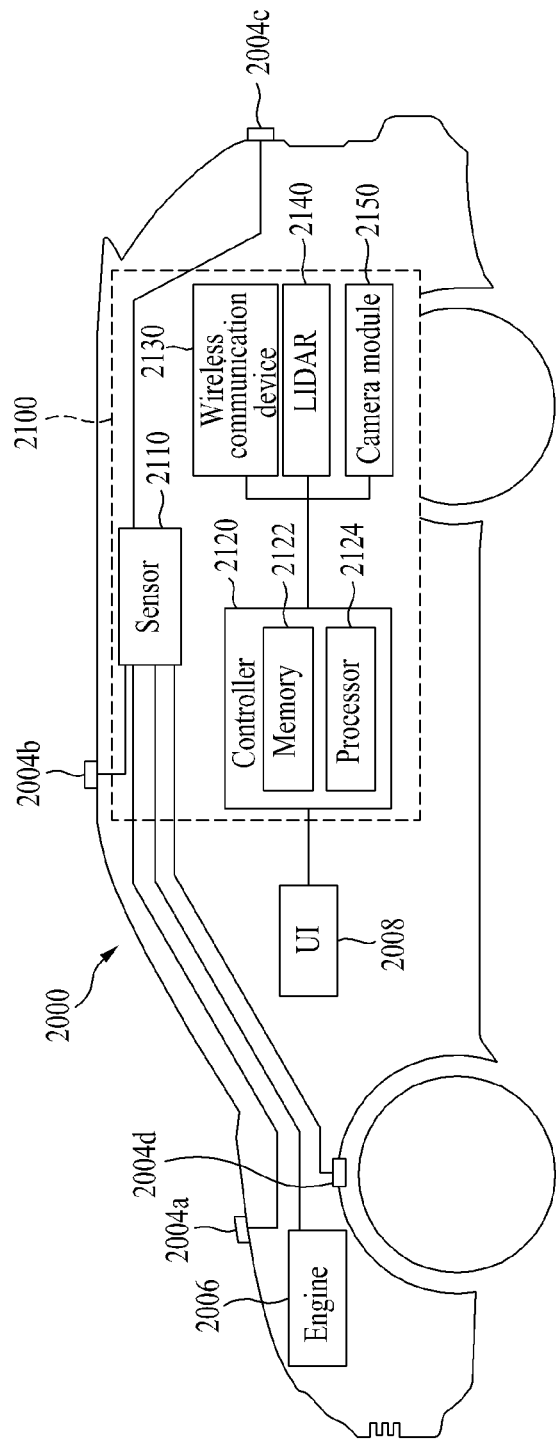
FIG. 12 is a diagram illustrating a vehicle on which the electronic device is mounted according to various embodiments.
Figure 13:
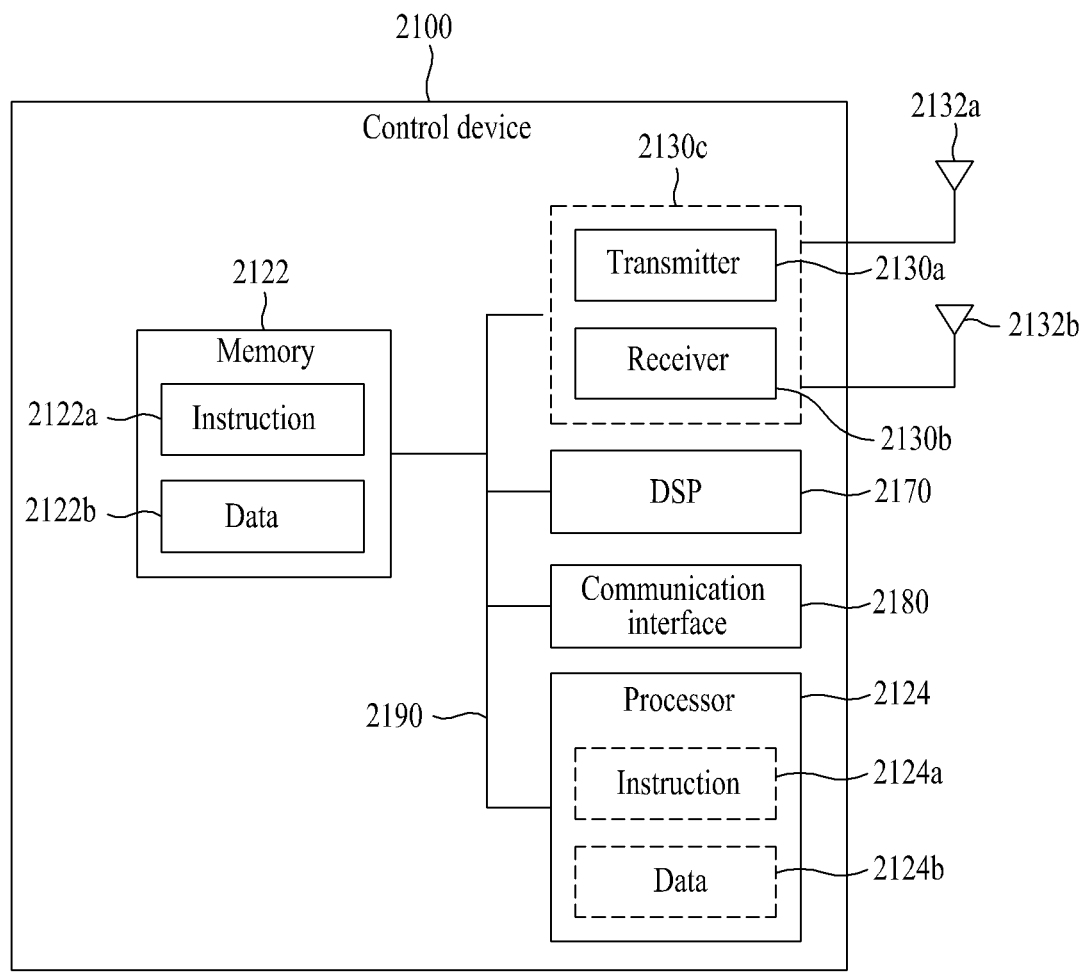
FIG. 13 is a diagram illustrating the electronic device of FIG. 12.

FIG. 12 is a diagram illustrating a vehicle on which the electronic device 100 is mounted according to various embodiments. FIG. 13 is a diagram illustrating the electronic device 100 of FIG. 12.

Referring to FIGS. 12 and 13, a control device 2100 (e.g., the electronic device 100 in FIG. 1) according to various embodiments may be mounted on a vehicle. In this case, the vehicle may be an autonomous vehicle 2000.

According to various embodiments, the control device 2100 may include a controller 2120 including a memory 2122 (e.g., the memory 170 in FIG. 1) and a processor 2124 (e.g., the processor 180 in FIG. 1), a sensor 2130 (e.g., the sensor module 160 in FIG. 1), a wireless communication device (e.g., the communication module 130 in FIG. 1), an LIDAR 2140 (e.g., the sensor module 160 in FIG. 1), and a camera module 2150 (e.g., the camera module 110 in FIG. 1).

According to various embodiments, the controller 2120 may be configured upon fabrication by a manufacturer of a vehicle or may be additionally configured in order to perform a function for autonomous driving after fabrication. Alternatively, the controller 2120 may include a component for performing a continuous and additional function through the update of the controller 2120 configured upon fabrication.

The controller 2120 may transmit a control signal to the sensor 2110, an engine 2006, a user interface (UI) 2008, the wireless communication device 2130, the LIDAR 2140, and the camera module 2150 included as other components within the vehicle. Furthermore, although not illustrated, the control signal may also be transmitted to an acceleration device, a braking system, a steering device, or a navigation device related to the driving of the vehicle.

According to various embodiments, the controller 2120 may control the engine 2006, may detect a speed limit in a road on which the autonomous vehicle 2000 runs, for example, and may control the engine 2006 so that a driving speed does not exceed the speed limit, or may control the engine 2006 to accelerate the driving speed of the autonomous vehicle 2000 within a range that does not exceed the speed limit. Furthermore, additionally, when sensing modules 2004a, 2004b, 2004c, and 2004d detect an environment outside the vehicle and transmit information on the environment to the sensor 2110, the controller 2120 may receive the information, may generate a signal that controls the engine 2006 or a steering device (not illustrated), and may control the driving of the vehicle.

If another vehicle or an obstacle is present ahead of the vehicle, the controller 2120 may control the engine 2006 or the braking system so that a driving speed is reduced, and may control a track, a driving path, a steering angle in addition to the speed. Alternatively, the controller 2120 may generate required control signals based on other recognition information of an external environment, such as a driving lane of a vehicle and a driving signal, and may control the driving of the vehicle.

The controller 2120 may perform communication with a surrounding vehicle or a central server in addition to the generation of its own control signal, and may also control the driving of the vehicle by transmitting a command for controlling peripheral devices based on the received information.

Furthermore, if a location of the camera module 2150 is changed or a view angle is changed, it may be difficult for the controller 2120 to recognize an accurate vehicle or lane. In order to prevent such a problem, the controller 2120 may generate a control signal for controlling the camera module 2150 to be calibrated. Accordingly, the controller 2120 may generate a calibration control signal to the camera module 2150. Accordingly, although the location where the camera module 2150 is mounted is changed due to vibration or an impact occurring in response to a movement of the autonomous vehicle 2000, a normal mounting location, direction, view angle, etc. of the camera module 2150 can be continuously maintained. If information on previously stored first mounting location, direction, or view angle of the camera module 2120 and information on the first mounting location, direction, or view angle of the camera module 2120 measured while the autonomous vehicle 2000 runs are different from each other by a threshold value or more, the controller 2120 may generate a control signal so that calibration is performed on the camera module 2120.

According to various embodiments, the controller 2120 may include the memory 2122 and the processor 2124. The processor 2124 may execute software stored in the memory 2122 in response to a control signal from the controller 2120. Specifically, the controller 2120 may store, in the memory 2122, data and instructions for determining the lifespan and failure of a nonvolatile memory storage device (e.g., the storage device 10 in FIG. 1) according to various embodiments. The instructions may be executed by the processor 2124 in order to implement one or more methods disclosed herein.

In this case, the memory 2122 may be stored in a nonvolatile recording medium executable by the processor 2124. The memory 2122 may store software and data therein through an external device. The memory 2122 may consist of a random access memory (RAM), a read only memory (ROM), a hard disk or the memory 2122 connected to a dongle.

The memory 2122 may store at least an operating system (OS), a user application, and executable instructions. The memory 2122 may also store application data, and array data structures.

The processor 2124 is a micro processor or a proper electronic processor, and may be a controller, a micro controller or a state machine.

The processor 2124 may be implemented as a combination of computing devices. The computing device may be a digital signal processor, a micro processor or a proper combination of them.

Furthermore, according to various embodiments, the control device 2100 may monitor characteristics inside and outside the autonomous vehicle 2000 and detect states inside and outside the autonomous vehicle 2000 through the at least one sensor 2110.

The sensor 2110 may consist of at least one sensing module 2004. The sensing module 2004 may be implemented at a specific location of the autonomous vehicle 2000 depending on a detection object. The sensing module 2004 may be disposed at the bottom, rear end, front end, top or side of the autonomous vehicle 2000, and may also be disposed in a part within the vehicle or a tire.

Accordingly, the sensing module 2004 may detect information related to driving, such as the engine 2006, a tire, a steering angle, a speed, and weight of the vehicle as internal information of the vehicle. Furthermore, the at least one sensing module 2004 may consist of an acceleration sensor, a gyroscope, an image sensor, a RADAR, an ultrasonic sensor, a LiDAR sensor, etc., and may detect motion information of the autonomous vehicle 2000.

The sensing module 2004 may receive specific data related to external environment states, such as information on the state of a road where the autonomous vehicle 2000 is placed, information on surrounding vehicles, and weather, as external information, and may also detect corresponding parameters of the vehicle. The detected information may be stored in the memory 2122 temporarily or depending on a long term purpose.

According to various embodiments, the sensor 2110 may integrate and collect information of the sensing modules 2004 for collecting information generated inside and outside the autonomous vehicle 2000.

The control device 2100 may further include the wireless communication device 2130 (e.g., the communication module 130).

The wireless communication device 2130 is configured to implement wireless communication between autonomous vehicles 2000. For example, the wireless communication device 2130 enables the autonomous vehicle 2000 to communicate with a mobile phone of a user, another wireless communication device 2130, another vehicle, a central device (traffic control device), a server, etc. The wireless communication device 2130 may transmit and receive wireless signals according to an access radio protocol. The wireless communication protocol may be Wi-Fi, Bluetooth, long-term evolution (LTE), code division multiple access (CDMA), wideband code division multiple access (WCDMA), or global systems for mobile communications (GSM), but is not limited thereto.

Furthermore, according to various embodiments, the autonomous vehicle 2000 may implement communication between vehicles through the wireless communication device 2130. That is, the wireless communication device 2130 may perform communication with another vehicle on a road and other vehicles through vehicle-to-vehicle (V2V) communication. The autonomous vehicle 2000 may transmit and receive information, such as a driving warning and traffic information, through V2V communication, and may request information from another vehicle or receive information from another vehicle. For example, the wireless communication device 2130 may perform V2V communication by using a designated short-range communication (DSRC) device or celluar-V2V (C-V2V) device. Furthermore, communication between a vehicle and another thing (e.g., an electronic device carried by a pedestrian) (vehicle to everything (V2X) communication in addition to the V2V communication may be implemented through the wireless communication device 2130.

Furthermore, the control device 2100 may include the LIDAR 2140. The LIDAR 2140 may detect an object around the autonomous vehicle 2000 while operating by using data sensed through the LIDAR. The LIDAR 2140 may transmit the detected information to the controller 2120. The controller 2120 may operate the autonomous vehicle 2000 based on the detected information. For example, if a vehicle running at a low speed is placed ahead of the autonomous vehicle 2000 based on the detected information, the controller 2120 may instruct the engine 2006 to reduce the speed of the autonomous vehicle 2000. Alternatively, the controller 2120 may instruct the autonomous vehicle 2000 to reduce an entry speed based on curvature of a curve that the autonomous vehicle 2000 enters.

The control device 2100 may further include the camera module 2150. The controller 2120 may extract object from an external image captured by the camera module 2150, and may process corresponding information.

Furthermore, the control device 2100 may further include imaging devices for recognizing an external environment. In addition to the LIDAR 2140, a RADAR, a GPS device, an odometer and other computer vision devices may be used. These devices selectively operate according to circumstances, enabling more precise detection.

The autonomous vehicle 2000 may further include the user interface 2008 for the aforementioned user input to the control device 2100. The user interface 2008 enables a user to input information through a proper interaction. For example, the user interface 2008 may be implemented as a touch screen, a keypad, a manipulation button, etc. The user interface 2008 may transmit an input or an instruction to the controller 2120. The controller 2120 may perform an operation of controlling the vehicle in response to the input or instruction.

Furthermore, the user interface 2008 may enable a device outside the autonomous vehicle 2000 to perform communication with the autonomous vehicle 2000 through the wireless communication device 2130. For example, the user interface 2008 may enable an operation in conjunction with a mobile phone, a tablet, or other computer devices.

Moreover, according to various embodiments, the autonomous vehicle 2000 has been described as including the engine 2006, but may include another type of propel system. For example, the vehicle may be driven by electric energy, or by hydrogen energy or by a hybrid system in which electric energy and hydrogen energy are combined. Accordingly, the controller 2120 may include a propel mechanism according to the propel system of the autonomous vehicle 2000, and may provide a corresponding control signal to the components of the propel mechanism.

Hereinafter, detailed components of the control device 2100 for determining the lifespan and failure of a nonvolatile memory storage device (e.g., the storage device 10 in FIG. 1) according to various embodiments are more specifically described with reference to FIG. 13.

The control device 2100 includes the processor 2124. The processor 2124 may be a general-purpose single or multi-chip micro processor, a dedicated micro processor, a microcontroller, a programmable gate array, etc. The processor may also be denoted as a central processing unit (CPU). Furthermore, according to various embodiments, the processor 2124 may be used as a combination of a plurality of processors.

Furthermore, the control device 2100 includes the memory 2122. The memory 2122 may be a given electronic component capable of storing electronic information. The memory 2122 may also include a combination of memories 2122 in addition to a single memory.

According to various embodiments, instructions and data 2122a and 2122b for determining the lifespan and failure of a nonvolatile memory storage device (e.g., the storage device 10 in FIG. 1) may be stored in the memory 2122. When the processor 2124 executes the instruction 2122a, the instructions 2122a and some or all of the data 2122b necessary to perform an instruction may be loaded onto the processor 2124 (2124a, 2124b).

The control device 2100 may include a transmitter 2130a, a receiver 2130b or a transceiver 2130c for permitting the transmission and reception of signals. One or more antennas 2132a and 2132b may be electrically connected to the transmitter 2130a, the receiver 2130b or the transceiver 2130c, and may additionally include antennas.

The control device 2100 may include a digital signal processor (DSP) 2170. The vehicle can rapidly process a digital signal through the DSP 2170.

The control device 2100 may include a communication interface 2180. The communication interface 2180 may include one or more ports and/or communication modules for connecting other devices and the control device 2100. The communication interface 2180 may enable a user and the control device 2100 to interface with each other.

Various elements of the control device 2100 may be connected by one or more buses 2190. The buses 2190 may include power buses, control signal buses, state signal buses, data buses, etc. Components may mutually exchange information and perform a target function through the buses 2190 under the control of the processor 2124.

The aforementioned device may be implemented by a hardware component, a software component and/or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, component, physical device, virtual equipment or computer storage medium or device in order to be interpreted by the processor or to provide an instruction or data to the processing device. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

According to various embodiments, each of elements (e.g., module or program) may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into a single element. In such a case, the integrated element may perform one or more functions of each of the plurality of elements identically or similarly to a function performed by a corresponding element of the plurality of elements before they are integrated. According to various embodiments, operations performed by a module, a program or other elements may be executed sequentially, in parallel, repeatedly, or heuristically, or one or more of the operations may be executed in different order or may be omitted, or one or more operations may be added.

The embodiments of the invention in which an exclusive property or privilege is claimed are defined as follows:

1. A method of an electronic device on and from which a nonvolatile memory storage device is mountable and separable, the method comprising:
   detecting a connection with the storage device;
   detecting identification information of the storage device;
   confirming whether the storage device has a function of autonomously identifying its state based on the identification information; and
   checking a lifespan of the storage device based on state information received from the storage device when the storage device has the function
   estimating the lifespan of the storage device when the storage device does not have the function; and
   outputting a guidance message for replacing the storage device based on the lifespan.

2. A method of an electronic device on and from which a nonvolatile memory storage device is mountable and separable, the method comprising:
   detecting a connection with the storage device;
   estimating a lifespan of the storage device; and
   outputting a guidance message for replacing the storage device based on the lifespan,
   wherein the electronic device comprises a storage buffer configured to temporarily store data to be stored in the storage device, and
   wherein the estimating of the lifespan comprises:
   storing data in the storage device by using the storage buffer; and
   generating the guidance message when an amount of data stored in the storage buffer is greater than a buffer threshold.

3. The method of claim 2, wherein the generating of the guidance message comprises:
   estimating the lifespan based on the amount of data; and
   generating the guidance message based on the lifespan.

4. The method of claim 1, wherein a record for an amount of data stored in the storage device is present in at least one of the electronic device or the storage device, and
   wherein the estimating of the lifespan comprises:
   generating the guidance message when a storage quantity estimated based on the amount of data is equal to or greater than a storage threshold;
   storing data in the storage device when the storage quantity is smaller than the storage threshold; and
   updating the record when storing the data is terminated.

5. The method of claim 4, wherein the storage quantity is estimated by a product of the amount of data and a predetermined write amplification factor (WAF) of the storage device.

6. The method of claim 4, wherein the generating of the guidance message comprises:
   estimating the lifespan based on the storage quantity; and
   generating the guidance message based on the lifespan.

7. The method of claim 1, further comprising:
   determining whether the storage device has failed in response to the connection with the storage device; and
   outputting the guidance message when the storage device fails.

8. The method of claim 7, wherein the determining of the failure comprises:
   determining that the storage device has failed when a write protection mode has been set in the storage device, and wherein the write protection mode is set in the storage device when the lifespan of the storage device is reached.

9. The method of claim 7, wherein the electronic device stores verification values of respective files while storing data in the storage device as the files, and
wherein the determining of the failure comprises:
checking a count of abnormal files by confirming integrity of each of the files stored in the storage device based on the verification values; and
determining that the storage device has failed when the count is greater than a count threshold.

10. An electronic device on and from which a nonvolatile memory storage device is mountable and separable,
a connection terminal configured for a connection with the storage device; and
a processor connected to the connection terminal and configured to store data in the storage device through the connection terminal,
wherein the processor is configured to:
detect identification information of the storage device,
confirm whether the storage device has a function of autonomously identifying its state based on the identification information,
check a lifespan of the storage device based on state information received from the storage device when the storage device has the function
estimate the lifespan of the storage device when the storage device does not have the function, and
output a guidance message for replacing the storage device based on the lifespan.

11. The electronic device of claim 10, further comprising a storage buffer configured to temporarily store data to be stored in the storage device,
wherein the processor is configured to:
store data in the storage device by using the storage buffer; and
generate the guidance message when an amount of data stored in the storage buffer is greater than a buffer threshold.

12. The electronic device of claim 11, wherein the processor is configured to:
estimate the lifespan based on the amount of data; and
generate the guidance message based on the lifespan.

13. The electronic device of claim 10, wherein a record for an amount of data stored in the storage device is present in at least one of the electronic device or the storage device, and
wherein the processor is configured to:
check the record,
generate the guidance message when a storage quantity estimated based on the amount of data of the record is equal to or greater than a storage threshold;
store data in the storage device when the storage quantity is smaller than the storage threshold; and
update the record when storing the data is terminated.

14. The electronic device of claim 13, wherein the storage quantity is estimated by a product of the amount of data and a predetermined write amplification factor (WAF) of the storage device.

15. The electronic device of claim 13, wherein the processor is configured to:
estimate the lifespan based on the storage quantity, and
generate the guidance message based on the lifespan.

16. The electronic device of claim 10, wherein the processor is configured to:
determine whether the storage device has failed in response to the connection with the storage device; and
output the guidance message when the storage device fails.

17. The electronic device of claim 16, wherein the processor is configured to determine that the storage device has failed when a write protection mode has been set in the storage device, and
wherein the write protection mode is set in the storage device when the lifespan of the storage device is reached.

18. The electronic device of claim 16, wherein the processor is configured to:
store verification values of respective files while storing data in the storage device as the files,
check a count of abnormal files by confirming integrity of each of the files stored in the storage device based on the verification values in response to the connection with the storage device; and
determine that the storage device has failed when the count is greater than a count threshold.

* * * * *